US009444298B2

(12) United States Patent
Kaiser et al.

(10) Patent No.: US 9,444,298 B2
(45) Date of Patent: Sep. 13, 2016

(54) INSULATION SYSTEM FOR AN ELECTRIC MACHINE

(71) Applicant: GM GLOBAL TECHNOLOGY OPERATIONS LLC, Detroit, MI (US)

(72) Inventors: Edward L. Kaiser, Orion, MI (US); Paul Buchholz, Warren, MI (US); Khwaja M. Rahman, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 671 days.

(21) Appl. No.: 13/869,299

(22) Filed: Apr. 24, 2013

(65) Prior Publication Data

US 2014/0319959 A1 Oct. 30, 2014

(51) Int. Cl.
| | |
|---|---|
| *H02K 3/48* | (2006.01) |
| *H02K 3/487* | (2006.01) |
| *H02K 3/34* | (2006.01) |
| *H02K 3/04* | (2006.01) |
| H02K 3/38 | (2006.01) |

(52) U.S. Cl.
CPC ............... *H02K 3/345* (2013.01); *H02K 3/04* (2013.01); *H02K 3/34* (2013.01); *H02K 3/48* (2013.01); *H02K 3/487* (2013.01); H02K 3/38 (2013.01)

(58) Field of Classification Search
CPC .......... H02K 3/04; H02K 3/34; H02K 3/345; H02K 3/38; H02K 3/48; H02K 3/487
USPC ........................................ 310/201, 214, 215
IPC .............................................. H02K 3/48, 3/487
See application file for complete search history.

(56) References Cited

U.S. PATENT DOCUMENTS

| | | | | | |
|---|---|---|---|---|---|
| 3,940,647 | A | * | 2/1976 | Keuper ................... | H02K 3/487 310/214 |
| 5,979,087 | A | * | 11/1999 | Bell ........................ | H02K 3/487 310/196 |
| 6,202,285 | B1 | * | 3/2001 | Bell .................... | H02K 11/0005 29/596 |
| 6,208,060 | B1 | * | 3/2001 | Kusase ................... | H02K 1/165 310/201 |
| 6,930,424 | B2 | * | 8/2005 | Even ........................ | H02K 3/12 310/180 |
| 2003/0011268 | A1 | * | 1/2003 | Even ........................ | H02K 3/12 310/179 |
| 2004/0189134 | A1 | * | 9/2004 | Onishi .................... | H02K 3/345 310/215 |
| 2010/0026132 | A1 | * | 2/2010 | Ooiwa ..................... | H02K 3/12 310/201 |
| 2014/0319959 | A1 | * | 10/2014 | Kaiser .................... | H02K 3/345 310/215 |

FOREIGN PATENT DOCUMENTS

| | | |
|---|---|---|
| CN | 1080095 A | 12/1993 |
| CN | 1177853 | 4/1998 |

* cited by examiner

*Primary Examiner* — John K Kim
(74) *Attorney, Agent, or Firm* — Quinn Law Group, PLLC

(57) ABSTRACT

A bar wound stator includes a stator core defining a plurality of slots. Bar-type conductors are disposed within each slot. Each slot includes a slot liner and an insulator cap. Each slot liner includes an end portion disposed against an inner wall surface, and side portions disposed against a first wall surface and a second wall surface respectively. Each insulator cap includes a base portion disposed against an outer wall surface, and side portions disposed against the first wall surface and the second wall surface respectively. The side portions of the insulator cap in each slot overlap the side portions of the slot liner in each slot along the first wall surface and the second wall surface respectively. Each slot includes a recessed feature in each of the first wall surface and the second wall surface to accommodate the overlapping side portions of the insulator cap and the slot liner.

15 Claims, 3 Drawing Sheets

INSULATION SYSTEM FOR AN ELECTRIC MACHINE

TECHNICAL FIELD

The invention generally relates to an electric machine, and more specifically to a bar wound stator of the electric machine.

BACKGROUND

A bar wound stator for an electric machine includes a stator core that defines a plurality of slots. A plurality of bar-type conductors is disposed within each of the slots. Each slot includes a slot liner disposed between the bar-type conductors and the walls of the slot to insulate between the bar-type conductors and the stator core. The slot liners must not be torn or pushed out of the slots during insertion of the bar-type conductors into the slots.

SUMMARY

An electric machine is provided. The electric machine includes a rotor assembly, and a bar wound stator circumferentially disposed about the rotor assembly. The bar wound stator is concentrically located with the rotor assembly about a central axis. The rotor assembly magnetically interacts with the bar wound stator for rotation about the central axis. The bar wound stator includes a stator core that extends along the central axis between a first end and a second end. The stator core includes a radial inner surface concentrically disposed about the central axis. The stator core defines a plurality of slots that extend along the central axis between the first end and the second end, and extend outward from the radial inner surface. A plurality of bar-type conductors is disposed within each of the plurality of slots. Each slot includes a first wall surface, a second wall surface, an inner wall surface, and an outer wall surface. The first wall surface is disposed opposite the second wall surface, and the inner wall surface is disposed opposite the outer wall surface. Each slot includes a slot liner and an insulator cap cooperating to insulate between the plurality of bar-type conductors and the stator core. Each slot liner includes an end portion disposed against the inner wall surface, and side portions disposed against the first wall surface and the second wall surface respectively. Each insulator cap includes a base portion disposed against the outer wall surface, and side portions disposed against the first wall surface and the second wall surface respectively. The side portions of the insulator cap in each slot overlap the side portions of the slot liner in each slot along the first wall surface and the second wall surface respectively. Each slot includes a recessed feature in each of the first wall surface and the second wall surface to accommodate the overlapping side portions of the insulator cap and the slot liner.

A bar wound stator is also provided. The bar wound stator includes a stator core that extends along a central axis between a first end and a second end. The stator core includes a radial inner surface that is concentrically disposed about the central axis. The stator core defines a plurality of slots that extend along the central axis between the first end and the second end, and extend outward from the radial inner surface. A plurality of bar-type conductors is disposed within each of the plurality of slots. Each slot includes a first wall surface, a second wall surface, an inner wall surface, and an outer wall surface. The first wall surface is disposed opposite the second wall surface, and the inner wall surface is disposed opposite the outer wall surface. Each slot includes a slot liner and an insulator cap cooperating to insulate between the plurality of bar-type conductors and the stator core. The slot liner includes an end portion disposed against the inner wall surface, and side portions disposed against the first wall surface and the second wall surface respectively. The insulator cap includes a base portion disposed against the outer wall surface, and side portions disposed against the first wall surface and the second wall surface respectively. The side portions of the insulator cap overlap the side portions of the slot liner along the first wall surface and the second wall surface respectively.

Accordingly, the slot liner and the insulator cap in each slot insulate between all surfaces of the slot and the bar-type conductors in the slot. The slot liner only insulates against three of the wall surfaces of the slot, i.e., the first wall surface, the second wall surface, and the inner wall surface, while the insulator cap insulates against the fourth wall surface, i.e., the outer wall surface, as well as the recessed sections of the inner and outer walls. Because the slot liner need only insulate against three of the wall surfaces, the slot liner may include a cuffed end to prevent insulator push out during wire insertion, and increase resistance to tearing. The recessed feature in the first side wall and the second side wall allow the slot liner and the insulator cap to overlap along the first wall surface and the second wall surface respectively, without affecting performance of the electric machine.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims. Furthermore, the invention may be described herein in terms of functional and/or logical block components and/or various processing steps. It should be realized that such block components may be realized by any number of hardware, software, and/or firmware components configured to perform the specified functions.

Figure 1:
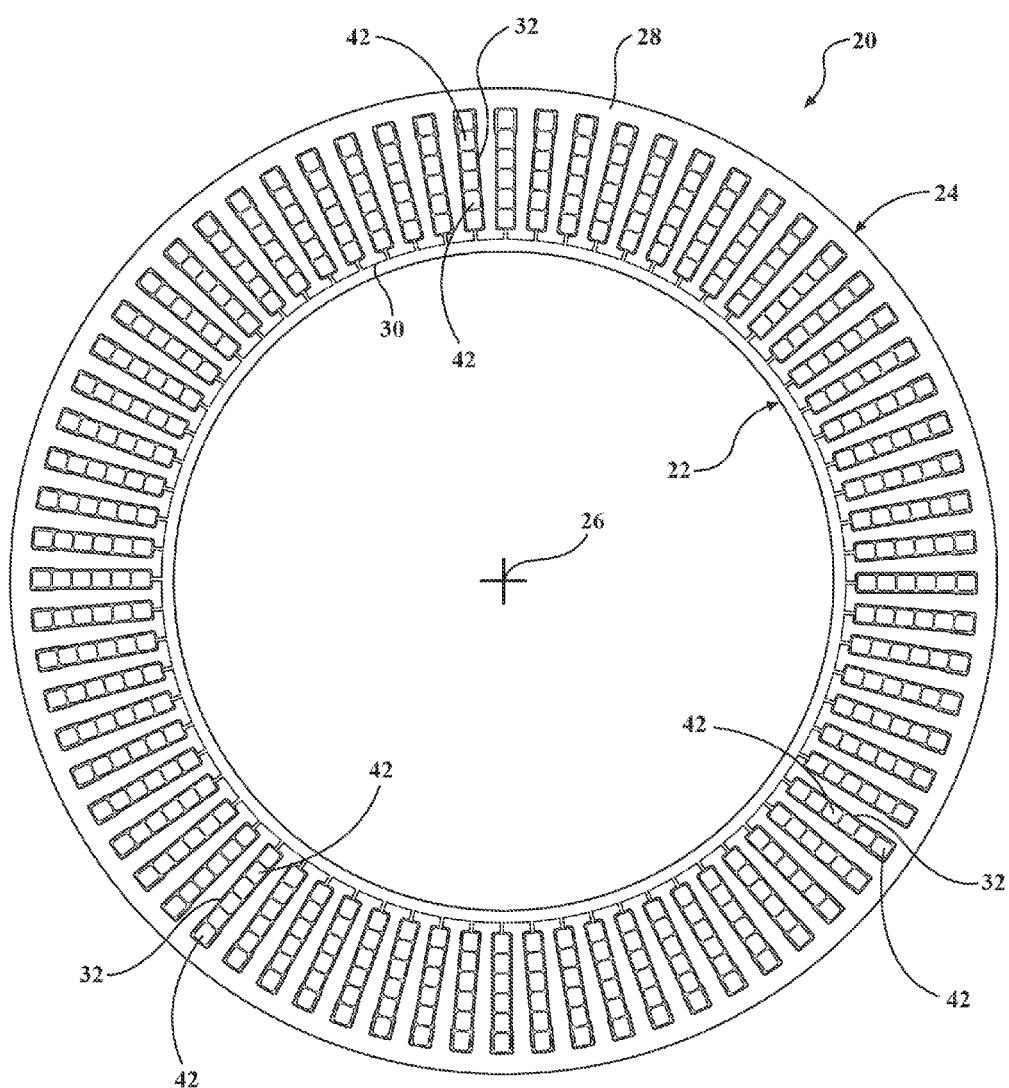
FIG. 1 is a schematic fragmentary cross sectional view of an electric machine.

Referring to the Figures, wherein like numerals indicate like parts throughout the several views, an electric machine is generally shown at 20 in FIG. 1. Referring to FIG. 1, the electric machine 20 may include, but is not limited to, an electric motor, generator, or some other similar device. The electric machine 20 includes a rotor assembly 22, and a bar wound stator 24. The bar wound stator 24 is circumferentially disposed about the rotor assembly 22, and is concentrically located with the rotor assembly 22 about a central axis 26. The rotor assembly 22 magnetically interacts with the bar wound stator 24 for rotation about the central axis 26 as is known in the art.

The bar wound stator 24 includes a stator core 28. The stator core 28 extends along the central axis 26, between a first axial end and a second axial end. The stator core 28 includes a radial inner surface 30 concentrically disposed about the central axis 26. The radial inner surface 30 of the stator core 28 is disposed opposite and faces the rotor assembly 22. The stator core 28 defines a plurality of slots 32. As shown, the slots 32 extend along the central axis 26 between the first axial end and the second axial end of the stator core 28, and extend radially outward from the radial inner surface 30. Each of the slots 32 defines a substantially rectangular cross section perpendicular to the central axis 26.

Figure 2:
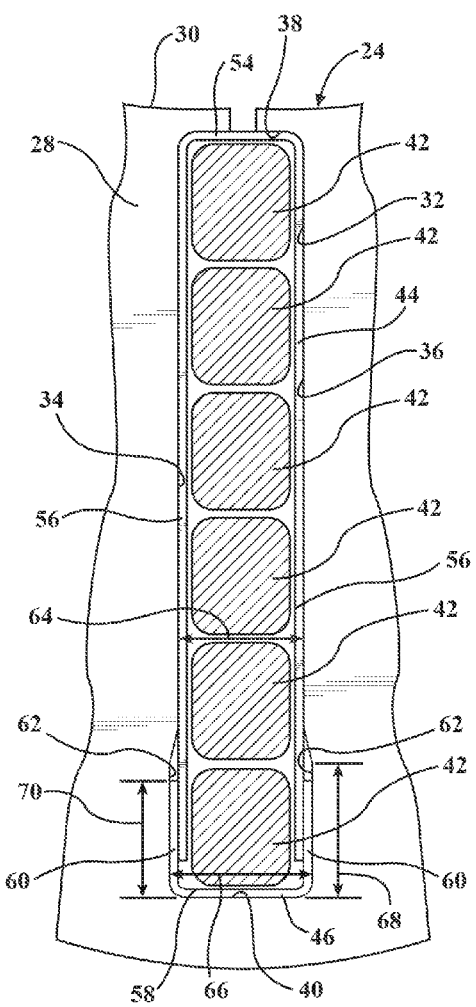
FIG. 2 is an enlarged schematic cross sectional view of a bar wound stator of the electric machine.

Referring to FIG. 2, each slot 32 includes a first wall surface 34, a second wall surface 36, an inner wall surface 38, and an outer wall surface 40. The first wall surface 34 is disposed opposite the second wall surface 36. The inner wall surface 38 is disposed opposite the outer wall surface 40. The inner wall surface 38 of each slot 32 is the radially innermost wall surface of the slot 32, and is disposed adjacent the radial inner surface 30 of the stator core 28. The outer wall surface 40 of each slot 32 is the radially outermost wall surface of the slot 32. The first wall surface 34 and the second wall surface 36 of each slot 32 extend between the inner wall surface 38 and the outer wall surface 40 of each slot 32. Furthermore, it should be appreciated that the inner wall surface 38 and the outer wall surface 40 of each slot 32 extend between the first wall surface 34 and the second wall surface 36 of each slot 32.

At least one bar-type conductor 42, and preferably a plurality of bar-type conductors 42, is disposed within each of the slots 32. As shown, the bar wound stator 24 includes six bar-type conductors 42 within each slot 32. However, it should be appreciated that the number of bar-type conductors 42 may vary from the six shown in the exemplary embodiment. As shown, the bar-type conductors 42 include a substantially rectangular cross section perpendicular to the central axis 26. However, it should be appreciated that the bar-type conductors 42 may be configured to include a cross sectional shape perpendicular to the central axis 26 other than the substantially rectangular cross section shown in the Figures.

Each slot 32 includes a slot liner 44 and an insulator cap 46. The slot liner 44 and the insulator cap 46 cooperating to insulate between the bar-type conductors 42 and the stator core 28. The slot liners 44 and the insulator caps 46 may include and be manufactured from any material suitable for use in an electric machine 20 and capable of insulating between the bar-type conductors 42 and the stator core 28. For example, the slot liners 44 and the insulator caps 46 may include and be manufactured from, but are not limited to, Nomex®, Peek®, Polyamide Epoxy, or a combination of polymer based materials.

Figure 3:
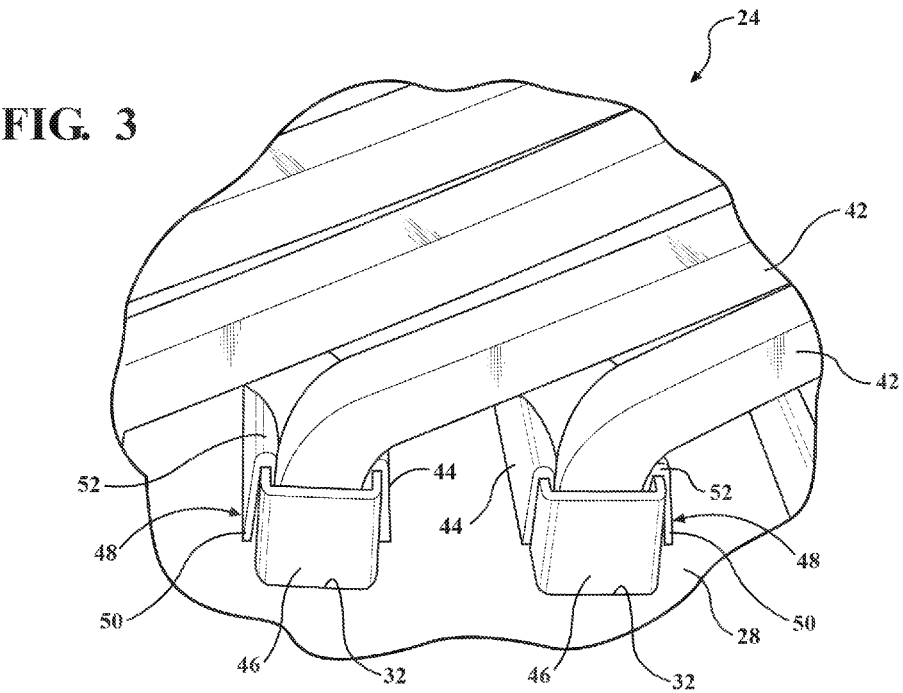
FIG. 3 is a schematic fragmentary perspective view of the bar wound stator shown in FIG. 2.

Referring to FIGS. 2 and 3, the slot liner 44 includes a cuffed end 48. The cuffed end 48 of the slot liners 44 may be disposed adjacent either of the first end or the second end of the stator core 28. Accordingly, each slot liner 44 extends outward beyond both of the axial ends of the stator core 28. A cuff portion 50 is folded back over against itself, along a crease 52, to define the cuffed end 48 of the slot liner 44. The cuffed end 48 of the slot liner 44 resists push-out of the slot liner 44 while inserting the bar-type conductors 42 into the slots 32 of the stator core 28 through the cuffed end 48. Furthermore, the cuffed end 48 of the slot liners 44 increases resistance to tearing during insertion of the bar-type conductors 42 into the slots 32 of the stator core 28 through the cuffed end 48.

Referring to FIG. 2, the slot liner 44 in each slot 32 includes an end portion 54 that is disposed against the inner wall surface 38 of the slot 32, and side portions 56 that are disposed against the first wall surface 34 and the second wall surface 36 of the slot 32 respectively. As such, one of the side portions 56 of the slot liner 44 in each slot 32 is disposed against the first wall surface 34, and the other one of the side portions 56 of the slot liner 44 in each slot 32 is disposed against the second wall surface 36. The insulator cap 46 in each slot 32 includes a base portion 58 that is disposed against the outer wall surface 40 of the slot 32, and side portions 60 that are disposed against the first wall surface 34 and the second wall surface 36 of the slot 32 respectively. As such, one of the side portions 60 of the insulator cap 46 in each slot 32 is disposed against the first wall surface 34, and the other one of the side portions 60 of the insulator cap 46 in each slot 32 is disposed against the second wall surface 36.

The side portions 60 of the insulator cap 46 in each slot 32 overlap the side portions 56 of the slot liner 44 in each slot 32 along the first wall surface 34 and the second wall surface 36 of the slot 32 respectively. Each slot 32 includes a recessed feature 62 in each of the first wall surface 34 and the second wall surface 36 to accommodate the overlapping side portions 56, 60 of the insulator cap 46 and the slot liner 44. As such, the first wall surface 34 of each slot 32 includes or defines a recessed feature 62 for accommodating the combined cross sectional widths of the overlapping side portions 56, 60 of the slot liner 44 and the insulator cap 46 disposed against the first wall surface 34. Similarly, the second wall surface 36 of each slot 32 includes or defines a recessed feature 62 for accommodating the combined cross sectional widths of the overlapping side portions 56, 60 of the slot liner 44 and the insulator cap 46 disposed against the second wall surface 36.

Each slot 32 includes a first width 64 that is measured between the first wall surface 34 and the second wall surface 36 adjacent the inner wall surface 38. Each slot 32 includes a second width 66 that is measured between the first wall surface 34 and the second wall surface 36 adjacent the outer wall surface 40. The second width 66 is the width between the recessed features 62 of the first wall surface 34 and the second wall surface 36. As such, the second width 66 is greater than the first width 64.

The recessed feature 62 in each of the first side wall and the second side wall of each slot 32 includes a length 68 measured from the outer wall surface 40 radially inward toward the inner wall surface 38. The length 68 of the recessed features 62 is equal to or greater than a length 70 of the side portions 60 of the insulator cap 46. Preferably, the length 70 of the side portions 60 of the insulator cap 46, which is measured from the base portion 58 of the insulator cap 46, is between the range of 2 mm and 20 mm.

As shown in FIGS. 2 and 3, the side portions 60 of the insulator cap 46 of each slot 32 are disposed between the side portions 56 of the slot liner 44 and the first wall surface 34 and second wall surface 36 of each slot 32 respectively. The cuffed end 48 of the slot liner 44 of each slot 32 wraps around the side portions 60 of the insulator cap 46, such that the side portions 60 of the insulator cap 46 are disposed within the fold of the cuffed end 48 of the slot liner 44.

Figure 4:
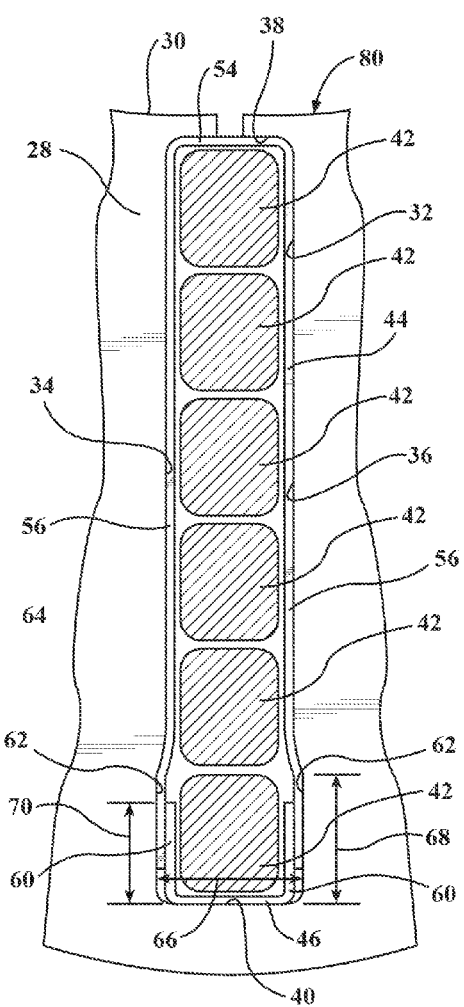
FIG. 4 is an enlarged schematic cross sectional view of an alternative embodiment of the bar wound stator.
Figure 5:
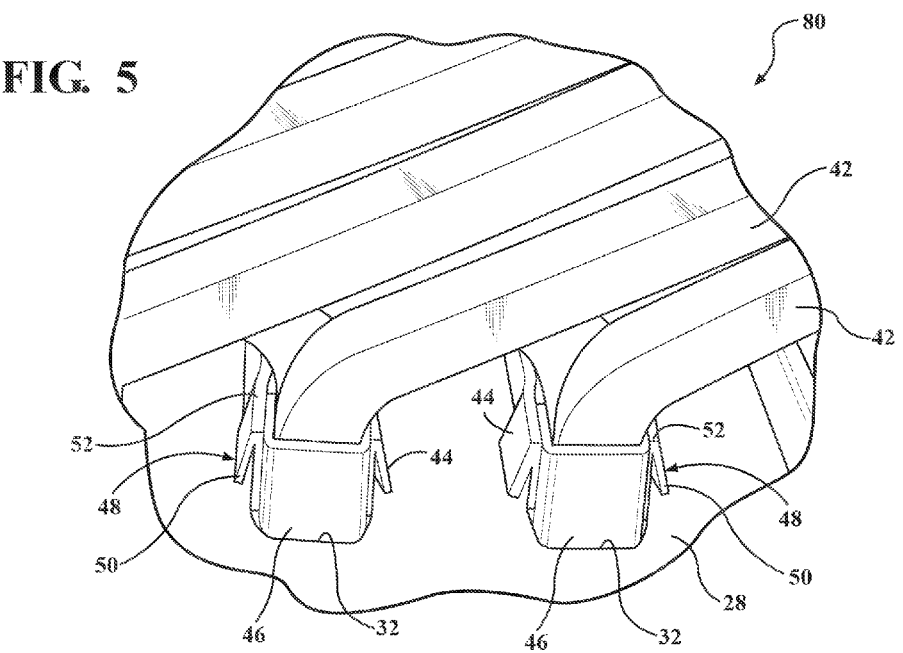
FIG. 5 is a schematic fragmentary perspective view of the alternative embodiment of the bar wound stator shown in FIG. 4.

Referring to FIGS. 4 and 5, and alternative embodiment of the bar wound stator is generally shown 80. The bar wound stator 80 of FIGS. 4 and 5 is identical to that of FIGS. 2 and 3 with the exception of the arrangement of the overlapping side portions 56, 60 of the slot liners 44 and the insulator caps 46. As shown in FIGS. 4 and 5, the side portions 56 of the slot liner 44 in each slot 32 are disposed between the side portions 60 of the insulator cap 46 and the first wall surface 34 and the second wall surface 36 respectively. Accordingly, the side portions 60 of the insulator cap 46 are disposed within an interior region of the slot liner 44, between the side portions 56 of the slot liner 44. As such, the side portions 60 of the insulator cap 46 of each slot 32 are disposed between the side portions 56 of the slot liner 44 in each slot 32 and the bar-type conductors 42 of each slot 32.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A bar wound stator comprising:
   a stator core extending along a central axis between a first end and a second end, and including a radial inner surface concentrically disposed about the central axis;
   wherein the stator core defines a plurality of slots extending along the central axis between the first end and the second end, and extending radially outward from the radial inner surface; and
   a plurality of bar-type conductors disposed within each of the plurality of slots;
   wherein each slot includes a first wall surface, a second wall surface disposed opposite the first wall surface, an inner wall surface, and an outer wall surface disposed opposite the inner wall surface;
   wherein each slot includes a slot liner and an insulator cap cooperating to insulate between the plurality of bar-type conductors and the stator core;
   wherein the slot liner in each slot includes an end portion disposed against the inner wall surface of the slot, and side portions disposed against the first wall surface and the second wall surface of the slot respectively;
   wherein the insulator cap in each slot includes a base portion disposed against the outer wall surface of the slot, and side portions disposed against the first wall surface and the second wall surface of the slot respectively;
   wherein the side portions of the insulator cap in each slot overlap the side portions of the slot liner in each slot along the first wall surface and the second wall surface of the slot respectively;
   wherein the side portions of the slot liner include a length that is greater than a length of the side portions of the insulator cap;
   wherein the length of each of the side portions of the slot liner is measured between the end portion of the slot liner and a radially outer edge of each respective side portion of the slot liner;
   wherein the length of each of the side portions of the insulator cap is measured between the base portion of the insulator cap and a radially inner edge of each respective side portion of the insulator cap;
   wherein each slot includes a first width measured between the first wall surface and the second wall surface adjacent the inner wall surface, and a second width measured between the first wall surface and the second wall surface adjacent the outer wall surface; and
   wherein the second width is greater than the first width to define a recessed feature in each of the first wall surface and the second wall surface adjacent the outer wall surface of each slot to accommodate the overlapping side portions of the insulator cap and the slot liner.

2. A bar wound stator comprising:
   a stator core extending along a central axis between a first end and a second end, and including a radial inner surface concentrically disposed about the central axis;
   wherein the stator core defines a plurality of slots extending along the central axis between the first end and the second end, and extending radially outward from the radial inner surface; and
   a plurality of bar-type conductors disposed within each of the plurality of slots;
   wherein each slot includes a first wall surface, a second wall surface disposed opposite the first wall surface, an inner wall surface, and an outer wall surface disposed opposite the inner wall surface;
   wherein each slot includes a slot liner and an insulator cap cooperating to insulate between the plurality of bar-type conductors and the stator core;
   wherein the slot liner in each slot includes an end portion disposed against the inner wall surface of the slot, and side portions disposed against the first wall surface and the second wall surface of the slot respectively;
   wherein the insulator cap in each slot includes a base portion disposed against the outer wall surface of the slot, and side portions disposed against the first wall surface and the second wall surface of the slot respectively;
   wherein the side portions of the insulator cap in each slot overlap the side portions of the slot liner in each slot along the first wall surface and the second wall surface of the slot respectively;
   wherein each slot includes a recessed feature in each of the first wall surface and the second wall surface to accommodate the overlapping side portions of the insulator cap and the slot liner; and
   wherein a length of each of the side portions of the insulator cap, measured between the base portion of the insulator cap and a respective radially inner edge of the side portions of the insulator cap, is between the range of 2 mm and 20 mm.

3. A bar wound stator as set forth in claim 2 wherein the recessed feature in each of the first side wall and the second side wall of each slot extends a length from the outer wall surface toward the inner wall surface a distance that is equal to or greater than the length of the side portions of the insulator cap.

4. A bar wound stator as set forth in claim 2 wherein each slot includes a first width measured between the first wall surface and the second wall surface adjacent the inner wall surface, and a second width measured between the first wall surface and the second wall surface adjacent the outer wall surface, wherein the second width is greater than the first width.

5. A bar wound stator as set forth in claim 2 wherein the slot liner includes a cuffed end disposed adjacent one of the first end or the second end of the stator core.

6. A bar wound stator as set forth in claim 5 wherein the side portions of the insulator cap are disposed between the side portions of the slot liner and the first wall surface and the second wall surface respectively.

7. A bar wound stator as set forth in claim 6 wherein the cuffed end of the slot liner wraps around the side portions of the insulator cap.

8. A bar wound stator as set forth in claim 5 wherein the side portions of the slot liner are disposed between the side portions of the insulator cap and the first wall surface and the second wall surface respectively.

9. An electric machine comprising:
a rotor assembly;
a bar wound stator circumferentially disposed about the rotor assembly and concentrically located with the rotor assembly about a central axis, wherein the rotor assembly magnetically interacts with the bar wound stator for rotation about the central axis, wherein the bar wound stator includes:
a stator core extending along the central axis between a first end and a second end, and including a radial inner surface concentrically disposed about the central axis;
wherein the stator core defines a plurality of slots extending along the central axis between the first end and the second end, and extending radially outward from the radial inner surface; and
a plurality of bar-type conductors disposed within each of the plurality of slots;
wherein each slot includes a first wall surface, a second wall surface disposed opposite the first wall surface, a inner wall surface, and an outer wall surface disposed opposite the inner wall surface;
wherein each slot includes a slot liner and an insulator cap cooperating to insulate between the plurality of bar-type conductors and the stator core;
wherein the slot liner in each slot includes an end portion disposed against the inner wall surface, and side portions disposed against the first wall surface and the second wall surface respectively;
wherein the insulator cap in each slot includes a base portion disposed against the outer wall surface, and side portions disposed against the first wall surface and the second wall surface respectively;
wherein the side portions of the insulator cap overlap the side portions of the slot liner along the first wall surface and the second wall surface respectively;
wherein each slot includes a recessed feature in each of the first wall surface and the second wall surface to accommodate the overlapping side portions of the insulator cap and the slot liner; and
wherein a length of each of the side portions of the insulator cap, measured between the base portion of the insulator cap and a respective radially inner edge of the side portions of the insulator cap, is between the range of 2 mm and 20 mm.

10. An electric machine as set forth in claim 9 wherein the recessed feature in each of the first side wall and the second side wall of each slot extends a length from the outer wall surface toward the inner wall surface, a distance that is equal to or greater than the length of the side portions of the insulator cap.

11. An electric machine as set forth in claim 9 wherein each slot includes a first width measured between the first wall surface and the second wall surface adjacent the inner wall surface, and a second width measured between the first wall surface and the second wall surface adjacent the outer wall surface, wherein the second width is greater than the first width.

12. An electric machine as set forth in claim 9 wherein the slot liner includes a cuffed end disposed adjacent one of the first end or the second end of the stator core.

13. An electric machine as set forth in claim 12 wherein the side portions of the insulator cap are disposed between the side portions of the slot liner and the first wall surface and second wall surface respectively.

14. An electric machine as set forth in claim 13 wherein the cuffed end of the slot liner wraps around the side portions of the insulator cap.

15. An electric machine as set forth in claim 12 wherein the side portions of the slot liner are disposed between the side portions of the insulator cap and the first wall surface and the second wall surface respectively.

* * * * *